United States Patent [19]

Charlebois et al.

[11] Patent Number: 4,528,150
[45] Date of Patent: Jul. 9, 1985

[54] METHODS AND APPARATUS FOR SEALING ARTICLES

[75] Inventors: Leonard J. Charlebois; Renato Mariani; Fred A. Huszarik, all of Kanata, Canada

[73] Assignee: Northern Telecom Limited, Montreal, Canada

[21] Appl. No.: 527,759

[22] Filed: Aug. 30, 1983

Related U.S. Application Data

[63] Continuation-in-part of Ser. No. 421,857, Sep. 23, 1982, abandoned.

[51] Int. Cl.³ .............................................. B29F 1/00
[52] U.S. Cl. .................................. 264/36; 264/328.4; 264/328.19; 425/558
[58] Field of Search ................... 264/36, 328.1, 328.4, 264/328.19; 425/129 R, 558

[56] References Cited

U.S. PATENT DOCUMENTS 4,091,062  5/1978  Nelson ................................. 264/36

*Primary Examiner*—Donald Czaja
*Assistant Examiner*—V. Fischbach
*Attorney, Agent, or Firm*—R. J. Austin

[57] ABSTRACT

A method of sealing an article by heating solid plastic material in a chamber into a flowable state and then forcing the material from the chamber into a reservoir in a manually portable device. While in the reservoir, the material is maintained homogeneously molten and flowable and the material is forced from the reservoir into a mould cavity at a sufficiently fast rate to fill the cavity before flow passages into the cavity become blocked with hardening material.

4 Claims, 5 Drawing Figures

METHODS AND APPARATUS FOR SEALING ARTICLES

This invention relates to methods and apparatus for sealing and is a continuation-in-part of application Ser. No. 421,857, filed Sept. 23, 1982 now abandoned.

In some industries, it is necessary for operators working in the field to seal articles, for instance against the effects of the surrounding atmosphere. Various methods of sealing have been suggested and one which has recently been proposed and has been successfully used is the method of sealing by providing a mould which surrounds the article and an encapsulation is formed around the article by transferring heated molten plastics material into the mould cavity and allowing it to cool and set. Encapsulations formed by moulding techniques have successfully been employed in the telecommunications cable industry. In the telecommunications cable industry it is necessary to form splices in the field, and this involves cutting into a cable to enable the conductors to be reached. The conductors are then severed and connected to other wires leading from the cable. It is then necessary to seal around the area of the splice to prevent the connections between the conductors from being adversely affected by atmospheric conditions such as dampness. The use of polymeric materials, as moulded encapsulations around such splices, has simplified previous encapsulation procedures and also has cheapened the encapsulation process.

Successful methods of sealing including the moulded encapsulations have been described in U.S. Pat. Nos. 4,152,539 granted May 1, 1979 and 4,322,573 granted Mar. 13, 1982, both patents being in the name of L. J. Charlebois. Moulding has also been suggested for sealing loading coil arrangements for telecommunications cables. Such a method is described in U.S. patent application Ser. No. 359,899, filed Mar. 19, 1982, in the name of L. J. Charlebois.

It has been found that preformed encapsulations around preformed splices may be easily provided upon cable before leaving the factory, by the use of factory installed extruders which can form an encapsulation in less than three minutes. Difficulties are being discovered, however, in the provision of encapsulations in the field. In the field, no ready machinery is available for the forming of encapsulations and it would be impractical to consider use of factory equipment in the field. The manufacture of encapsulated or sealed splices in the field by modern techniques must require the use of small manually portable units of apparatus for providing molten flowable plastics material and for forcing such material into mould cavities. However, the smallest equipment which is capable of being carried by an operator and used in the field is extremely slow to operate and would add unduly to the cost of the operation in addition to the unnecessary time consumption. These particular units are small extruders and only deliver around 11 pounds of molten, flowable material per hour. This means that for each encapsulation, about twenty minutes is required to fill the mould. Apart from the unnecessary amount of time involved, the time period itself makes the process impractical because the plastics material which is initially forced into the mould cavity commences to harden while further material is being forced in. The problem then lies in the closing of the passages into the mould with hardened material and/or the layering of the plastics material in the mould as different sections harden before the moulding process is completed. Where layering takes place, an inferior encapsulation results and this may lead to cracking of the moulded encapsulation. Further to this, these small extruders are driven electrically and require electrical power cables extending to the power source. This makes them extremely difficult to use in holes dug to reach buried cables and the presence of damp in the holes makes the use of high current power dangerous.

A further problem which is found is that although the moulding of encapsulations for splices only requires a pressure within the mould of no greater than 100 lbs/square inch and may even be as low as 3 or 5 lbs/square inch, the available equipment delivers molten plastics up to 10,000 lbs/square inch. On the one hand, while the available equipment performs an essential requirement of melting the plastics material and providing a molten homogeneous mix, its weight, unmanageable nature and working pressures render it unsuitable for use in the field.

Similar problems to the above exist in the formation of plug seals in gas pressurizable cable.

The present invention is concerned fundamentally with a method of overcoming the above problems. Basically, this method is concerned with preheating the material to make it flowable and homogeneous and then forcing the material into a reservoir of a manually portable accumulator in which the plastic material is maintained in a flowable molten and homogeneous condition. The material in this condition is then capable of being transported in the accumulator to a mould for the purpose of sealing around an article and, with the reservoir in communication with the mould cavity, the molten flowable material is forced from the reservoir into the cavity at a sufficiently fast rate to fill the cavity before the flow passages become blocked with hardened material. This process, of course, requires the use of a manually portable accumulator having the capability of being able to force the molten material into the mould cavity before the hardening procedure effectively blocks the passage way.

Accordingly, the present invention provides a method of sealing an article comprising heating plastic material in a chamber to melt the plastic and render it flowable, forcing the molten flowable material from an outlet of the chamber and through an inlet of a reservoir defined within a manually portable accumulator, maintaining the plastic material at a molten flowable temperature while held in the reservoir, disposing the reservoir in communication with a mould cavity partly defined by the article to be sealed, and forcing the molten flowable material from the reservoir into the mould cavity at a sufficiently fast rate to fill the cavity before flow passages into the cavity become blocked with hardening material.

With the process according to the invention, the homogeneous and molten flowable material is provided in this state by a heating and pressurizing device which thus needs to provide the heat and pressure for this purpose. When in the reservoir, however, such heat and pressure are unnecessary and a simple maintaining of the heat to retain the homogeneous and molten flowable condition of the material is all that is necessary.

In use of the process according to the invention, it is preferred that the molten material in the portable accumulator is forced from the reservoir by piston action. It is also to be preferred that the forcing of the material from the reservoir is effected by manual operation.

Manual operation may be effected, by operation of a handle or other manually operable element which causes the piston to advance along the reservoir by suitable power operated means such as a hydraulic jack or a mechanical screw jack. Alternatively, a small electrical motor may be used for advancing the piston.

The above process, according to the invention, is applicable to the encapsulation of a spliced region of telecommunications cable and for forming plug seals in cable. For an encapsulation, the spliced region of the cable is placed in the mould cavity and the molten flowable material in the reservoir is forced into the cavity to form the encapsulation. Alternatively, the whole of the encapsulation may not be formed by the molten material. In this case preformed encapsulating elements may be placed around the spliced region and, together with the spliced region, may be held in their relative positions by mould parts which define a cavity opening onto opposing surfaces of the elements. A seal is then provided between the opposing surfaces of the elements to form the elements into a single integral encapsulation by forcing the molten flowable material into the cavity and thus around and into any space formed between the opposing surfaces and thus seal between the elements.

The invention also includes an apparatus for sealing an article comprising a plastics heating and pressurizing device defining a chamber to contain plastic material and comprising means to heat the material into a molten flowable state and for forcing the molten material from an outlet of the chamber, and a manually portable accumulator defining a reservoir with an inlet, the heating and pressurizing device and accumulator having means to assemble them together with the inlet to the reservoir aligned with the outlet from the chamber to interconnect the chamber and reservoir and allow for transfer of molten and flowable plastics material from the chamber to the reservoir, and the accumulator also having means to retain the plastics material in a molten flowable condition when in the reservoir, and means for forcing the material from the reservoir to fill a mould cavity during a sealing operation, said forcing means actuable to fill a cavity at a sufficiently fast rate to ensure, during filling, that blocking of the flow passages to the cavity with hardening material does not occur.

With the apparatus according to the invention the heating and pressurizing device may be any conventional type of injection or extrusion apparatus used for moulding purposes and may even be slow acting. Hence, heating and pressurizing apparatus which is otherwise too slow in operation and is too heavy and cumbersome to be used on the site, may be used to fill the accumulator with molten material. The avoidance of heating and pressurizing means to convert the plastics material quickly into a molten state in the accumulator assists in reducing its weight and design may deal primarily with a rapid operating speed. The accumulator is locatable at the outlet from such equipment to enable the molten flowable plastics material to be passed into the reservoir. The two parts of the apparatus may then be uncoupled for the accumulator to be transported manually to the site of the sealing operation.

With the use of the apparatus according to the invention, the accumulator may be assembled together with the heating device and the plastics material may be heated into its molten state in the chamber and transferred to the reservoir while the operator is preparing the article in readiness for the sealing operation. Hence, no time is spent by the operator in waiting for the material in the chamber to be formed into its molten state in readiness for the encapsulation operation. Alternatively, the accumulator may be filled with the molten flowable material by factory equipment on the shop floor and then transported by truck with other and similar accumulators for use in the field. Preparing the accumulators filled with the molten flowable material in either of the two above ways ensures that accumulators are always available filled with molten plastics material for immediate use for encapsulation or sealing purposes.

The reservoir of the accumulator is preferably a cylinder and the means for forcing the material from the reservoir comprises a piston and means to move the piston along the cylinder. The moving means may be a mechanical or hydraulically operated means or electrically operated means. The mechanical or hydraulically operated means may have manual operation which is extremely convenient in use in the field especially when conducted in a pit prepared below ground level.

The means for maintaining the plastics material in a molten flowable condition may comprise a heating means surrounding the reservoir and/or an insulating means. The insulating means may be in the form of a jacket of known insulating material such as K-Wool insulation and the heating means is conveniently an electrical heating element extending around the cylinder and in close proximity to it. The electrical heating element may be connectable to a battery to provide the energy for heating purposes. Alternatively, the heating means may be connectable to an electrical generator which is carried, for instance, by the operator's truck.

Embodiments of the invention will now be described by way of example with reference to the accompanying drawings in which.

Figure 1:
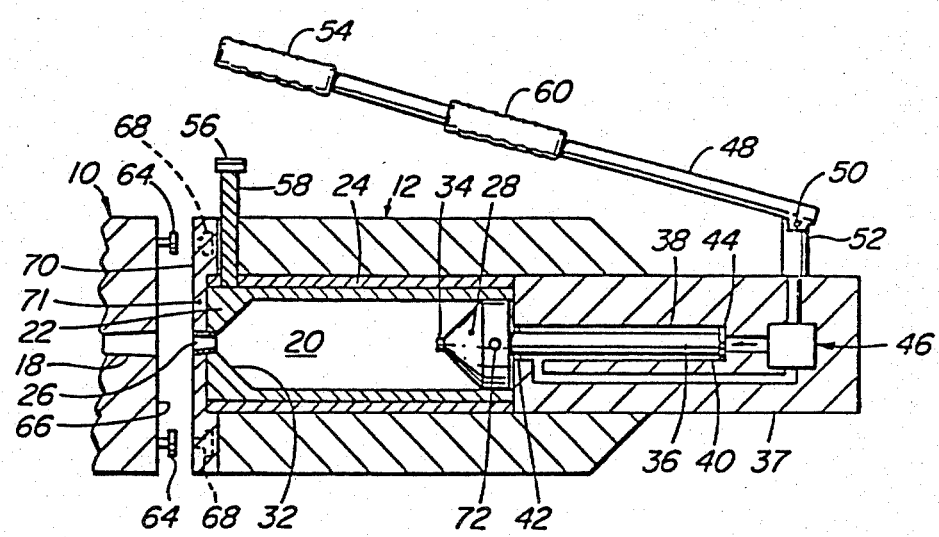
FIG. 1 is a cross-sectional view through part of apparatus according to a first embodiment for forming an encapsulation around a splice of a telecommunication cable.
Figure 2:
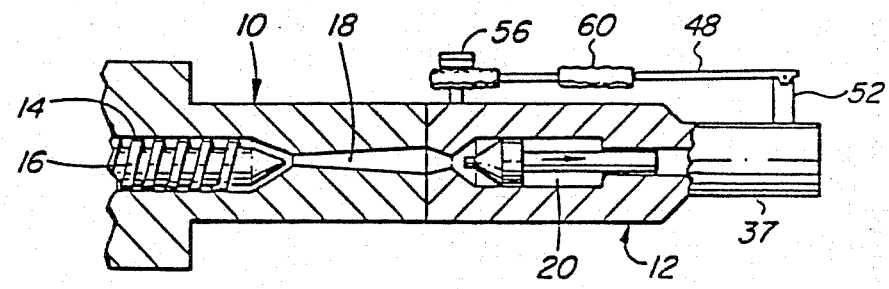
FIG. 2 is a view similar to FIG. 1 and on a smaller scale, showing the apparatus in assembled condition.
Figure 3:
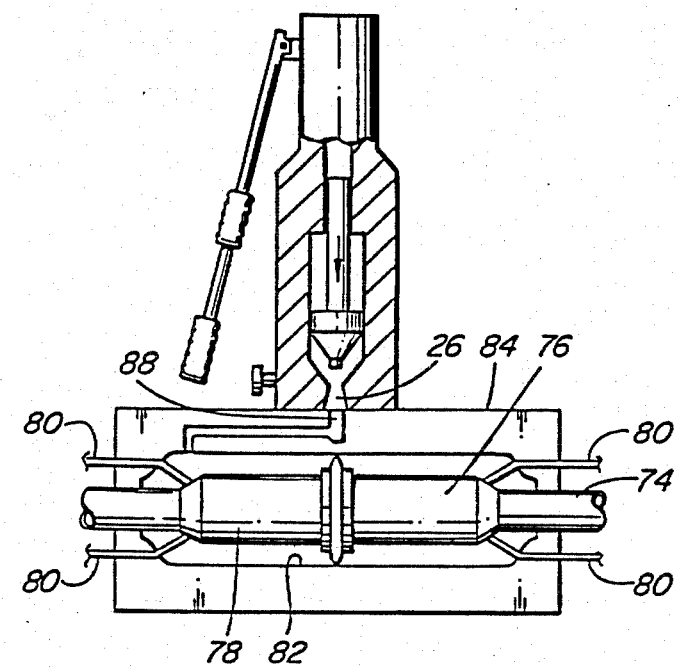
FIG. 3 is a cross-sectional view showing part of the apparatus fitted to a moulding apparatus during an encapsulation process.

As shown by FIGS. 1 to 3 of the drawings, apparatus for forming a plastics encapsulation around a splice formed in a telecommunications cable comprises a plastics heating and pressurizing device 10 and a manually portable accumulator 12 for molten plastics.

The device 10 is a conventional injection equipment or extrusion equipment as normally used for heating plastics material into a homogeneous molten flowable condition and then for forcing the material from the device into a mould under pressure. In the apparatus according to the invention, and, as described in this embodiment the device 10 forms part of a total apparatus in which the accumulator 12 is an intermediary between the device 10 and the mould. As shown, more clearly, by FIG. 2 the device 10 is actually a conventional extrusion device comprising an extrusion barrel 14 enclosing an extruder screw 16. Plastics material to be heated and extruded is dropped in pellet form into a hopper (not shown) and then is forced along the extruder barrel 14 by the screw which imparts to the plastics material, sufficient pressure to raise the temperature in the material for it to become molten and flowable before it reaches the outlet 18 to the extruder barrel. The device 10 is either a shop floor installed device as normally used in factories or a device which may be secured to the structure of a truck for transportation purposes.

Although the device 10 is heavily robust and operates at high pressures, e.g. up to 10,000 lbs/square inch, the accumulator 12 operates at much lower pressures. Its robustness and weight are thus reduced accordingly. The accumulator 12 has a maximum operating pressure of 100 lbs/square inch (and this may be as low as 5 lbs/square inch) for filling a mould during encapsulation moulding.

The accumulator 12 is shown in detail in FIG. 1. The IM accumulator 12 is provided for the purpose of receiving from the device 10 the molten flowable material and for maintaining it in its molten flowable condition until required for the moulding operation to form the encapsulation. The accumulator 12 is then capable of forcing the molten flowable material into a mould cavity at a sufficiently fast rate to ensure that the cavity becomes filled with plastics material before hardening of the material inside the mould passages prevents the passage of further molten material. The total length of the device 12 is up to 30 inches and defines a reservoir 20 of sufficient volume to hold up to 4 pounds of molten plastics material which is sufficient to the encapsulation process. The reservoir 20 is of cylindrical form and is defined within a stainless steel cylinder 22. The cylinder is 4 inches in diameter, 11.75 inches long and has a wall thickness of 0.25 inches. The cylinder is surrounded circumferentially by a means for maintaining plastics material in the reservoir in a molten and flowable condition. This means is in the form of a heater jacket 24 containing windings of a 1500 watt electrical heating element (not shown) which terminates at one end in an exterior plug for connection to an electrical generator. The reservoir has a tapered inlet 26 at one end and this end of the reservoir is of frustoconical shape to reduce the size of the cylinder to that of the inlet. The diameter of the inlet at its smallest cross-section is 0.5 inches. A piston 28 is slideable within the reservoir. The piston has a frustoconical end 30 complementary to the frustoconical surface 32 of the reservoir. The piston also has a short extension 34 at the narrow end of the frustrum 30. The frustoconical arrangement of the cylinder surface 32 and piston end 30 is provided to ensure that when the piston is at the inlet end 26 of the reservoir, substantially no air or plastics material remains within the reservoir. The piston is formed from phenolic resin covered in stainless steel. As shown by FIG. 1, the piston has a piston rod 36 extending rearwardly into a body 37 of the device 12. Between the piston rod and the surface of a chamber 38 within which the rod slides is defined an annular space 40 which is sealed at one end by 'O' ring 42. At the other end a seal is formed between a flange 44 on the piston and the body 37. The size of this space varies as the piston rod moves in the chamber 38. The space 40 forms part of a hydraulic mechanism, shown generally at 46, which is used for urging the piston to move towards the inlet end of the reservoir. As hydraulic mechanisms are known generally, no further detail will be given of the mechanism in this specification except to state that the mechanism is operated manually by a handle 48 which is pivotally connected at position 50 to support 52, extending from the body 37.

The handle has at one end, an operating hand grip 54 by which it may be held for pivotal movement of the handle during operation of the hydraulic mechanism. The handle 48 also acts as a carrying handle for the device 12. For this purpose, the handle is locatable under a cross member 56 of a rigid extension 58 disposed at the opposite end of the device from the support 52. FIG. 2 shows the position of the handle in its carrying position in which a further grip 60 surrounding a central portion of the handle may be held for carrying the device in a substantially horizontally balanced condition.

Surrounding the heating means 24 and part of the main body of the accumulator 12 is a heat insulation material 62 which assists the heater jacket 24 in retaining the plastics material in the reservoir 20 in a molten flowable condition.

The device 10 and accumulator 12 are associated in that means is provided which coacts on them to cause them to be assembled together. While assembly means may be of any suitable construction, in this particular case a simple bayonet fitting is acceptable, part of which is on each apparatus part. As shown, the device 10 has bayonet pins 64 extending from an end surface 66. Recesses 68 in an end surface 70 of a metal plate 71 of the accumulator 12 receive the pins 64 during assembly. These recesses 68 extend slightly in a circumferential direction (not shown) to enable a slight circumferential twisting action of the accumulator 12 to take place during locking and unlocking of the accumulator to the device 10. As shown by the positioning of the assembled apparatus parts in FIGS. 1 and 2, the end surfaces 70 and 66 abut to align the outlet 18 with the inlet 26 for the reservoir 20. The surfaces 66 and 70 are suitably machined so as to provide a substantially sealed surface contact region to prevent the plastics material from spewing from between the device 10 and the accumulator during transfer of the material into the accumulator.

In use of the apparatus, it is of little concern that the device 10 may take an inordinate amount of time to melt the plastics material into a flowable and homogeneous condition and to extrude it from the outlet 18. This is because heating of the plastics in device 10 and its transfer by screw 16 into the accumulator 12 with the devices locked together may take place while the operator in the field is preparing a splice in a cable for encapsulation purposes. As the splicing procedure may be rather lengthy, the accumulator 12 will be filled with the molten material when required for the encapsulation process. The plastics material may be of any type such as low density polyethylene, e.g. as sold by Dupont under their grade reference 2114. At the beginning of the transfer operation into the accumulator, the piston 28 is seated at the end of the inlet end of the reservoir. The temperature of the molten material during transfer is around 180° to 190° C. The piston travels towards the other end of the reservoir as it is forced away from the inlet by the pressure of the plastic material. The arrow on the piston rod in FIG. 2 indicates this. Movement of the piston should be such that little or no resistance is given to the flow of the material and, for this purpose, the hydraulic mechanism is arranged so that no back pressure to the movement of the piston is provided. Also, the piston should move as easily as possible and for this purpose a simple hinge pin 72 (FIG. 1) suffices to hold the piston to the rod 36 thqs enabling some free lateral movement of the piston to take place.

Upon the operator completing his splicing operation, he removes the filled accumulator 12 from the device 10 and carries it to the site of the splice. The position of the piston with the reservoir filled is as shown in FIG. 1.

The splice may be of a construction as described in U.S. Pat. No. 4,322,573, granted Mar. 30, 1982 or in 4,152,539, granted May 1, 1979 to L. J. Charlebois. As shown by FIG. 3, a telecommunications cable 74 has a spliced region 76 comprising wrappings of moisture impermeable material 78 surrounding electrical conductors connected to drop wires 80 which extend from various positions of the splice. This splice 76 is disposed within a mould cavity 82 defined between two mould halves 84, only one of which is shown. The mould cavity 82 is fed by flow passages 86 from a gate 88.

The mould is fillable at pressures of up to 5 lbs/square inch. In fact, if pressures increase above this value, there is the possibility that the completed splice and the cable within the mould would be crushed. To indicate when the mould is filled, it is provided with flow overflow ports which indicate to the splicer when to switch off the accumulator 12. The accumulator is capable of expelling its load of 4 pounds in 30 seconds and may fill the mould 1n this time, although a filling time of 60 seconds is a comfortable one in practice.

To fill the mould cavity with the molten flowable plastics material, the accumulator 12 is assembled to the mould 84 with the inlet 26 aligned with the gate 88. Assembly to the mould is conveniently performed by a bayonet locking device by using the recesses 68 on the accumulator to receive pins (not shown) on tne mould. Of course any other convenient mechanical locking device may be used if desired. Operation of the hydraulic mechanism then forces the molten material from the accumulator 12 and into the passages 86 and thus into the mould cavity so as to fill the cavity and form the encapsulation after cooling.

It is found that with the accumulator 12 having a piston which is operated to force out the plastics material, the process of mould filling is faster than with any known manually portable device which, in addition, invariably includes means to heat the solid plastics material into its molten state. Thus the present invention provides an apparatus having an accumulator which is basically concerned with retaining the heat in the plastics material after it has become molten and for expelling this material in as fast a manner as possible. The avoidance in the accumulator of any means for heating the material quickly to form it from a solid into the molten state reduces the weight and size of the device while also enabling its total design to be concerned with retaining heat and the fast expelling function.

In the first embodiment, the plastic within the accumulator will remain in a molten state for thirty minutes with the heater switched off. As a result, the encapsulation of the splice is performed without electrical attachments to the accumulator. Since manholes may contain explosive gas or wet conditions, this method is of particular advantage whereas many present closure methods involve the use of electrical power or open flames at the worksite, e.g. for heat shrink or lead closures. These present practices can be dangerous.

Figure 4:
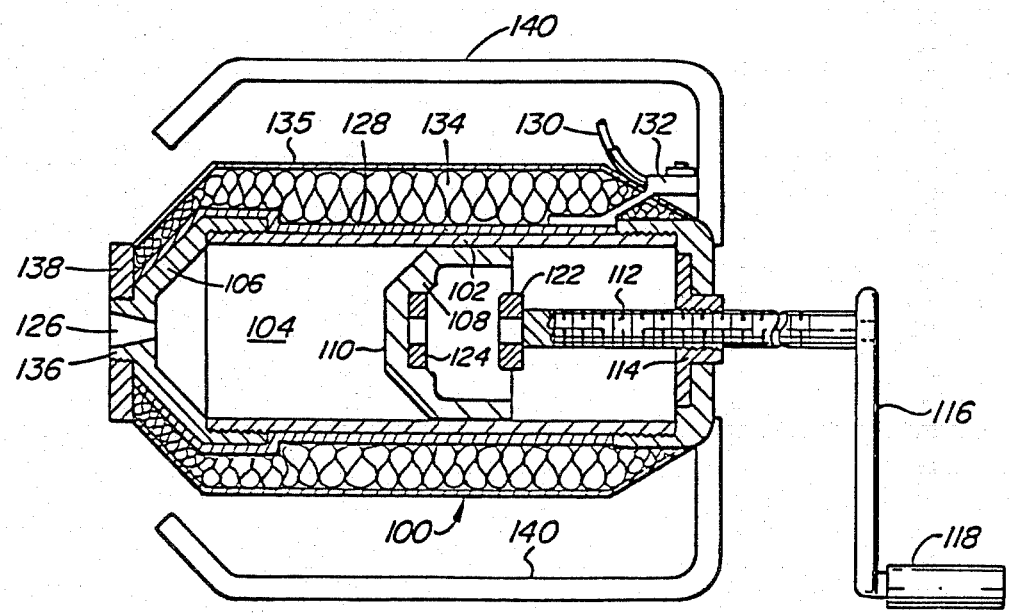
FIG. 4 is a view similiar to FIG. 1 of part of an apparatus according to a second embodiment.

In a second embodiment, as shown by FIG. 4, the accumulator 12 is replaced by a different manually portable accumulator 100.

The accumulator 100 comprises a stainless steel cylinder 102 defining reservoir 104, closed at an inlet end by a frustoconical end cap 106. A piston 108, slidable within the reservoir, has a complementary frustoconical end surface 110.

Means for urging the piston towards the inlet end comprises a screw threaded means consisting of a screw 112 passing into the reservoir behind the piston, the screw being in engagement with a threaded bush 114. A crank 116 and handle 120 are used for turning the screw exteriorly of the cylinder 102. The end of the screw within the reservoir has a seating plate 122 secured thereto, and this plate engages a thrust bearing 124, mounted in the rear of the piston head, when the screw is turning to urge the piston towards inlet 126. As shown by FIG. 4, the plate 122 is spaced from the bearing.

Surrounding the cylinder 102 and cap 106, there is heater jacket 128 having wiring 130 to connect it to a source of electrical energy. A temperature control 132 is provided to control the temperature of plastic within the reservoir to around 180° C. to 190° C.

Disposed around the heater jacket is a layer 134 of insulation and over this is a protective layer (about 0.03") 135 of aluminum.

Secured to a short nozzle 136 at inlet 126, is a metal bearing plate 138 for abutting against the device 10 during assembly.

One or more cantilever handles 140 extend in a fixed position from a rear end of accumulator 100.

The accumulator 100 has a maximum weight of 30 lbs. while avoiding the weight necessary in the first embodiment for the body 37.

In use, the piston is urged against the cap 106 and the screw 112 removed from the reservoir for a d1stance sufficient to enable the piston to move back against the plate 122 and permit a required amount of molten homogeneous plastic, for a given encapsulation, to pass into the reservoir.

The plastic is then stored in molten state until required at which time, the screw 112 urges the piston along the reservoir to expel the plastic into the mould cavity at a rate comparable to that of the accumulator in the first embodiment.

With the use of a heater as in the second embodiment, an accumulator may store plastic in a molten state for up to eight or nine hours before expelling it into a mould cavity. Thus a plurality of such accumulators may be charged with molten material early in the day and each accumulator will have its heater connected to an electrical source, such as an electrical generator carried, for instance, upon the operator's truck. When the accumulator is required for a mould filling function, such as the formation of an encapsulation, it is disconnected from the generator and carried to the site for the splice.

In practice, accumulators have been charged with molten plastic and maintained the charge molten throughout the day before being used in conjunction with a mould. This has been achieved successfully and without ill effects. However, if plastics material is being stored for lengthy periods in molten state, precautions may be necessary to prevent breakdown and maintain stability of its structure. The polyethylene under consideration in these embodiments suffers no change during the first hour in a molten state, but its melt index changes slightly by the time it has been molten for three hours. Successful eqcapsulations have been formed from molten polethylene which has been from eight to nine hours in an accumulator when antioxidants have been used to stabilize the material. In these instances of use after eight hours, two antioxidants have been used at the rate of 1000 ppm of the polyethylene. These antioxidants are "Sanitox" R, a trade name of Monsanto Corporation, and "Irganox" 1010, a trade name for Ciba-Geigy. "Irganox" 1010 is widely recognized as an antioxidant in North America for wire and cable use. "Irganox" 1010 may be used as the only antioxidant when used in the amount of 2000 ppm of the polyethylene.

In the above embodiments and according to further aspects of this invention, other plastics materials are successfully used instead of polyethylene. These materials include ethylene acrylic acid and an ionomer resin derived from ethylene/methacrylic acid copolymers such as sold under the trade mark "Surlyn" by Dupont under product numbers 1652 and 1702.

The accumulator 12 may be used for forming an encapsulation as shown in FIG. 3 for the first embodiment. However, both the accumulators from both embodiments may be used for forming a plug seal in cable.

Figure 5:
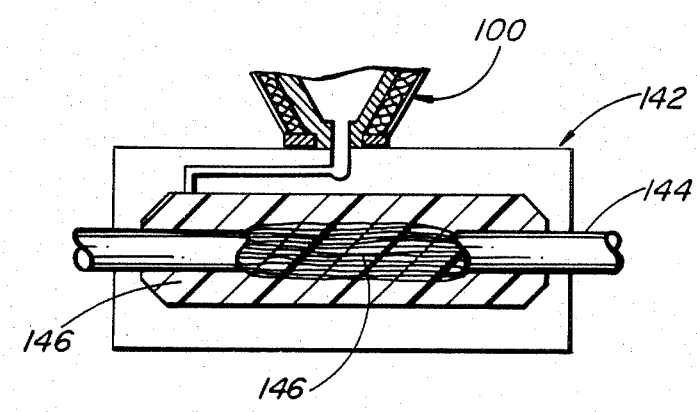
FIG. 5 is a view similar to FIG. 3 showing the accumulator of the second embodiment used for forming a plug seal in cable.

For instance, as shown by FIG. 5, a mould 142 is placed around a cable 144 which has a length 146 which is devoid of core surrounding material. In this devoid length, the individual insulated conductors are spread apart by hand to allow molten polyethylene to flow between them. The mould which is similar in construction to the mould 84 except that it does not allow for dropwires to pass through it, is placed to enclose the length 146 and with ends of the mould seating against the end regions of the cable jacket which are adjacent to the length 146.

Molten polyethylene is then dispensed from accumulator 100 into mould 142 and completely fills the mould cavity while providing a plug seal 146 upon setting. It is found that with the molten material being ejected from the accumulator in 60 seconds or less, the molten plastic does not harden around the conductors before mould filling is completed and the forming of layers of hardened plastic, such as would weaken the plug structure, is prevented.

After setting of the plug seal, a length of cable at one side of the seal is gas pressurizable with the seal effectively preventing or substantially preventing escape of gas from one side of the seal to the other. Alternatively, the lengths of cable at both sides of the seal may be pressurized at different pressures and/or from different sources, the seal effectively maintaining the two pressurized regions separate.

What is claimed is:

1. A method of sealing an article comprising:
   heating plastic material in a chamber to melt the plastic and render it flowable and homogeneous;
   forcing the molten flowable material from an outlet of the chamber and through an inlet of a reservoir defined within a manually portable accumulator;
   maintaining the plastic material homogeneous and at a molten flowable temperature while held in the reservoir;
   disposing the reservoir in communication with a mould cavity partly defined by the article to be sealed; and
   forcing the molten flowable material from the reservoir into the mould cavity at a sufficiently fast rate to fill the cavity before flow passages into the cavity become blocked with hardening material.

2. A method according to claim 1 comprising forcing the material from the reservoir by piston action.

3. A method according to claim 2 wherein the mould cavity is filled by forcing the molten flowable material from the reservoir at a maximum pressure within the cylinder of 100 lbs/square inch.

4. A method according to claim 1 for providing a plug seal for gas pressurizable telecommunications cable comprising:
   taking the cable in which a certain length is devoid of core surrounding material;
   enclosing said devoid length within a mould to define the mould cavity with insulated conductors of the core partly defining the mould cavity; and
   forcing the molten material from the reservoir into the cavity to cause it to flow between and surround the insulated conductors in said devoid length so as to engage the insulation of individual conductors intimately and also to flow around end regions of the jacket lying adjacent to said devoid length.

* * * * *